United States Patent
Cho et al.

(10) Patent No.: US 9,249,276 B2
(45) Date of Patent: Feb. 2, 2016

(54) CONJUGATED DIENE POLYMER END-MODIFIED WITH ALKOXYSILANE DERIVATIVE

(71) Applicant: KOREA KUMHO PETROCHEMICAL CO., LTD., Seoul (KR)

(72) Inventors: Hanjoung Cho, Daejeon (KR); Jae Young Ko, Daejeon (KR); Dae Hyung Lee, Deajeon (KR); Cheol Min Park, Gwangju (KR); Sang Chul Ji, Incheon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 255 days.

(21) Appl. No.: 14/026,453

(22) Filed: Sep. 13, 2013

(65) Prior Publication Data

US 2014/0243447 A1  Aug. 28, 2014

(30) Foreign Application Priority Data

Feb. 26, 2013  (KR) .................. 10-2013-0020436

(51) Int. Cl.
*C08K 3/36* (2006.01)
*C08K 3/04* (2006.01)
*C08C 19/44* (2006.01)

(52) U.S. Cl.
CPC . *C08K 3/36* (2013.01); *C08C 19/44* (2013.01); *C08K 3/04* (2013.01)

(58) Field of Classification Search
CPC ............ C08C 19/44; C08K 3/04; C08K 3/36; C08L 9/06; C08L 9/062
See application file for complete search history.

(56) References Cited

U.S. PATENT DOCUMENTS

| 3,441,583 A | * | 4/1969 | Murphy .................... C07F 7/02 528/28 |
| 5,508,333 A | | 4/1996 | Shimizu |
| 2010/0152369 A1 | | 6/2010 | Shibata et al. |
| 2011/0207879 A1 | | 8/2011 | Ito et al. |

FOREIGN PATENT DOCUMENTS

| EP | 2266819 | * | 12/2010 | ................. B60C 1/00 |
| GB | 789950 | * | 1/1958 | ............... C03C 17/30 |
| JP | 06128448 | * | 5/1994 | ............... C08L 51/00 |
| JP | 2001240706 | * | 9/2001 | ............... C08L 15/00 |
| JP | 2010-270210 | * | 12/2010 | ............... C08C 19/25 |

OTHER PUBLICATIONS

Derwent Abstract of JP 06128448, pp. 1-2.*
Derwent Abstract of JP 2010-270210, pp. 1-2.*
Derwent Abstract of JP 2001-240706, pp. 1-2.*

* cited by examiner

*Primary Examiner* — Alexander Kollias
(74) *Attorney, Agent, or Firm* — Hauptman Ham, LLP

(57) ABSTRACT

The present invention relates to a conjugated diene polymer end-modified with an alkoxysilane derivative. More particularly, the present invention relates to an end-modified conjugated diene polymer, wherein an alkoxysilane derivative having an ether group and a dialkylamino group is bonded as end modifier to an end of a conjugated diene polymer, which is useful as a rubber material for a tire tread owing to improved compatibility with an inorganic reinforcing agent and improves dynamic mechanical properties such as wet traction, rolling resistance, Mooney viscosity, processability, etc.

7 Claims, 2 Drawing Sheets

CONJUGATED DIENE POLYMER END-MODIFIED WITH ALKOXYSILANE DERIVATIVE

CROSS-REFERENCE TO RELATED APPLICATIONS

This application claims priority under 35 U.S.C. §119 to Korean Patent Application No. 10-2013-0020436, filed on Feb. 26, 2013, in the Korean Intellectual Property Office, the disclosure of which is incorporated herein by reference in its entirety.

BACKGROUND (a) Technical Field

The present invention relates to a conjugated diene polymer end-modified with an alkoxysilane derivative. More particularly, the present invention relates to an end-modified conjugated diene polymer, wherein an alkoxysilane derivative having an ether group and a dialkylamino group is bonded as end modifier to an end of a conjugated diene polymer, which is useful as a rubber material for a tire tread owing to improved compatibility with an inorganic reinforcing agent.

(b) Background Art

Recently, researches are carried out diversely to develop high-performance rubber for environment-friendly and energy-saving high-performance tires. For development of a high-performance tire, development of a rubber satisfying the dynamic properties of low rolling resistance and high wet traction, which can have a direct effect on fuel efficiency, is essential.

In general, styrene-butadiene rubber (SBR) or butadiene rubber (BR) is used as tire rubber. They are prepared by solution polymerization or emulsion polymerization. Solution styrene-butadiene rubber (SSBR), which is prepared by solution polymerization, is prepared in an organic solvent using an organolithium initiator. Emulsion styrene-butadiene rubber (ESBR), which is prepared by emulsion polymerization, is prepared by solidifying latex which is obtained using a radical polymerization initiator. The solution polymerization method is advantageous in that not only the control of a micromolecular structure such as the vinyl content of a conjugated diene, the block ratio styrene, etc. but also the control of the ratio and number of coupling, which can have a great effect on the physical properties of the polymer, is possible as desired. Since the polymer prepared by the solution polymerization method is relatively superior to the polymer prepared by the emulsion polymerization method in dynamic properties such as rolling resistance and wet traction, it is widely used to prepare a tire rubber. In addition, the solution polymerization method allows control of cold flow at room temperature by modifying the polymer using an organolithium initiator and an end modifier and introducing a functional group as well as improvement of dispersibility of a reinforcing agent by improving processability and binding ability during mixing with the reinforcing agent. In particular, by improving compatibility with carbon black or silica used as a reinforcing agent in a tire, the method can provide improved (tread) wear resistance, reduced rolling resistance and improved wet traction.

The existing solution polymerization methods using functional initiators or end modifiers are as follows.

U.S. Pat. No. 5,508,333 discloses a method for obtaining dynamic and mechanical properties superior to those of the existing rubber materials by modifying the end of a polymer molecule with an alkoxysilane-based compound having an epoxy group. Although the alkoxysilane-based end modifier allows introduction of a hydroxyl group to the end of the polymer, it is not easy to control the physical properties of the polymer because control of coupling ratio is impossible.

US Patent Application Publication No. 2011-0207879 discloses a method for improving processability and reducing rolling resistance by improving compatibility with carbon black using a diphenylethylene-based polymerization initiator. However, the diphenylethylene-based polymerization initiator is not suitable for preparation of an environment-friendly tire.

US Patent Application Publication No. 2010-0152369 discloses a modified rubber prepared using an alkoxysilane compound having a primary amine group with a hydrolysable group protected as an end modifier and application of a mixture of the modified rubber with silica to a tire tread. Although the rubber having the alkoxysilane end modifier introduced can improve the physical properties of a tire tread by improving hysteresis loss, control of coupling ratio is not easy and long-term storage is problematic because of high cold flow.

As described above, in spite of the consistent efforts to improve compatibility with carbon black or silica used as an inorganic reinforcing agent and dispersibility by varying initiators or end modifiers, development of a rubber for a tire with improved mechanical and dynamic properties still remains a problem.

SUMMARY

The present invention is directed to providing a conjugated diene polymer end-modified with an alkoxysilane derivative of a particular structure.

The present invention is also directed to providing a polymer composition including the end-modified conjugated diene polymer and an inorganic reinforcing agent.

The present invention is also directed to providing a tire having superior physical properties in terms of wet traction, rolling resistance and fuel efficiency, which is formed using the polymer composition.

In an aspect, the present invention provides an end-modified conjugated diene polymer wherein an alkoxysilane-based end modifier represented by Chemical Formula 1 is bound to an end of a conjugated diene polymer:

[Chemical Formula 1]

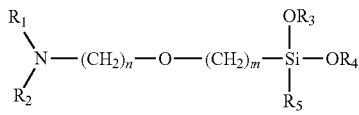

wherein $R_1$ and $R_2$, which are identical or different, represent $C_1$-$C_{10}$ alkyl, or tri($C_1$-$C_{10}$ alkyl)silyl; $R_3$ and $R_4$, which are identical or different, represent $C_1$-$C_{10}$ alkyl; $R_5$ represents $C_1$-$C_{10}$ alkyl or $C_1$-$C_{10}$ alkoxy; and n and m respectively represent an integer from 0 to 5.

In another aspect, the present invention provides a polymer composition including: the end-modified conjugated diene polymer; and an inorganic reinforcing agent.

In another aspect, the present invention provides a tire prepared from the polymer composition.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION

Figure 1:
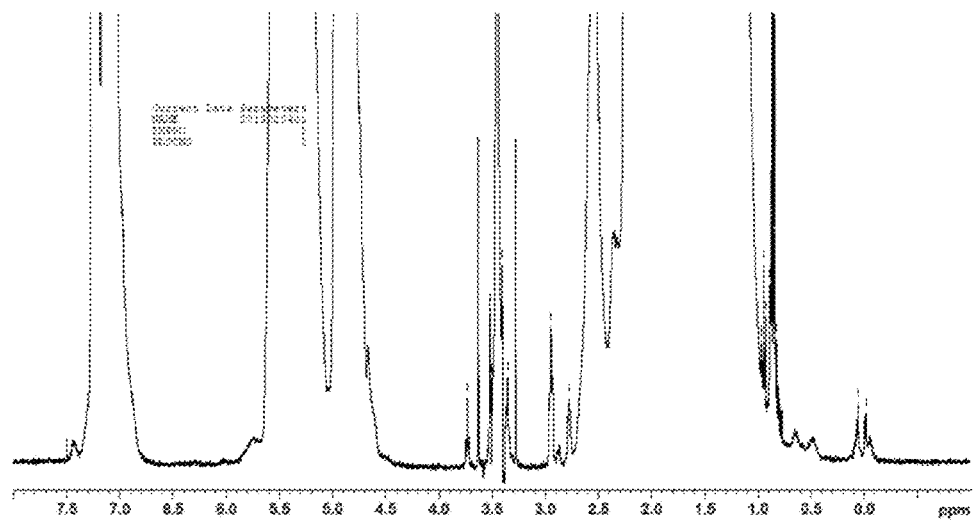
FIG. 1 is a $^1$H NMR spectrum of a styrene-butadiene copolymer end-modified with N,N-dimethyl-2-(3-(dimethoxymethylsilyl)propoxy)ethanamine.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an end-modified conjugated diene polymer wherein an alkoxysilane-based end modifier substituted with an alkyl group having a tertiary amine group and an ether group is bound to an end of a conjugated diene polymer:

The alkoxysilane-based derivative used as an end modifier in the present invention may be represented by Chemical Formula 1. Preparation method, characteristics, etc. of the alkoxysilane-based derivative represented by Chemical Formula 1 may be referred to, for example, in Korean Patent Application No. 10-2012-0105576.

[Chemical Formula 1]

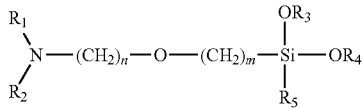

In Chemical Formula 1, $R_1$ and $R_2$, which are identical or different, represent $C_1$-$C_{10}$ alkyl, or tri($C_1$-$C_{10}$ alkyl)silyl; $R_3$ and $R_4$, which are identical or different, represent $C_1$-$C_{10}$ alkyl; $R_5$ represents $C_1$-$C_{10}$ alkyl or $C_1$-$C_{10}$ alkoxy; and n and m respectively represent an integer from 0 to 5.

Specifically, in the alkoxysilane-based end modifier represented by Chemical Formula 1, $R_1$ and $R_2$ may respectively represent methyl, ethyl, n-propyl, isopropyl, n-butyl, s-butyl, tert-butyl, trimethylsilyl, triethylsilyl, methyl(diethyl)silyl, (dimethyl)ethylsilyl, tri(n-butyl)silyl or tert-butyl(dimethyl) silyl, $R_3$ and $R_4$ may respectively represent n-propyl, isopropyl, n-butyl, s-butyl or tert-butyl, $R_5$ may represent methyl, ethyl, n-propyl, isopropyl, n-butyl, s-butyl, tert-butyl, methoxy, ethoxy, n-propoxy, isopropoxy, n-butoxy, s-butoxy or tert-butoxy and n and m may respectively represent an integer from 0 to 5.

Specific examples of the alkoxysilane-based end modifier represented by Chemical Formula 1 according to the present invention may include:
N,N-dimethyl-1-(2-(trimethoxysilyl)ethoxy)methanamine,
N,N-dimethyl-1-(2-(dimethoxymethylsilyl)ethoxy)methanamine,
N,N-dimethyl-1-(2-(dimethoxyethylsilyl)ethoxy)methanamine,
N,N-dimethyl-1-(2-(triethoxysilyl)ethoxy)methanamine,
N,N-dimethyl-1-(2-(diethoxymethylsilyl)ethoxy)methanamine,
N,N-dimethyl-1-(2-(diethoxyethylsilyl)ethoxy)methanamine,
N,N-diethyl-1-(2-(trimethoxysilyl)ethoxy)methanamine,
N,N-diethyl-1-(2-(dimethoxymethylsilyl)ethoxy)methanamine,
N,N-diethyl-1-(2-(dimethoxyethylsilyl)ethoxy)methanamine,
N,N-diethyl-1-(2-(triethoxysilyl)ethoxy)methanamine,
N,N-diethyl-1-(2-(diethoxymethylsilyl)ethoxy)methanamine,
N,N-diethyl-1-(2-(diethoxyethylsilyl)ethoxy)methanamine,
N,N-bis(trimethylsilyl)-1-(2-(trimethoxysilyl)ethoxy)methanamine,
N,N-bis(trimethylsilyl)-1-(2-(dimethoxymethylsilyl)ethoxy)methanamine,
N,N-bis(trimethylsilyl)-1-(2-(dimethoxyethylsilyl)ethoxy)methanamine,
N,N-bis(trimethylsilyl)-1-(2-(triethoxysilyl)ethoxy)methanamine,
N,N-bis(trimethylsilyl)-1-(2-(diethoxymethylsilyl)ethoxy)methanamine,
N,N-bis(trimethylsilyl)-1-(2-(diethoxyethylsilyl)ethoxy)methanamine,
N,N-dimethyl-1-(3-(trimethoxysilyl)propoxy)methanamine,
N,N-dimethyl-1-(3-(dimethoxymethylsilyl)propoxy)methanamine,
N,N-dimethyl-1-(3-(dimethoxyethylsilyl)propoxy)methanamine,
N,N-dimethyl-1-(3-(triethoxysilyl)propoxy)methanamine,
N,N-dimethyl-1-(3-(diethoxymethylsilyl)propoxy)methanamine,
N,N-dimethyl-1-(3-(diethoxyethylsilyl)propoxy)methanamine,
N,N-diethyl-1-(3-(trimethoxysilyl)propoxy)methanamine,
N,N-diethyl-1-(3-(dimethoxymethylsilyl)propoxy)methanamine,
N,N-diethyl-1-(3-(dimethoxyethylsilyl)propoxy)methanamine,
N,N-diethyl-1-(3-(triethoxysilyl)propoxy)methanamine,
N,N-diethyl-1-(3-(diethoxymethylsilyl)propoxy)methanamine,
N,N-diethyl-1-(3-(diethoxyethylsilyl)propoxy)methanamine,
N,N-bis(trimethylsilyl)-1-(3-(trimethoxysilyl)propoxy)methanamine,
N,N-bis(trimethylsilyl)-1-(3-(dimethoxymethylsilyl)propoxy)methanamine,
N,N-bis(trimethylsilyl)-1-(3-(dimethoxyethylsilyl)propoxy)methanamine,
N,N-bis(trimethylsilyl)-1-(3-(triethoxysilyl)propoxy)methanamine, N,N-bis(trimethylsilyl)-1-(3-(diethoxymethylsilyl)propoxy)methanamine,
N,N-bis(trimethylsilyl)-1-(3-(diethoxyethylsilyl)propoxy)methanamine,
N,N-dimethyl-2-(2-(trimethoxysilyl)ethoxy)ethanamine,
N,N-dimethyl-2-(2-(dimethoxymethylsilyl)ethoxy)ethanamine,
N,N-dimethyl-2-(2-(dimethoxyethylsilyl)ethoxy)ethanamine,
N,N-dimethyl-2-(2-(triethoxysilyl)ethoxy)ethanamine,
N,N-dimethyl-2-(2-(diethoxymethylsilyl)ethoxy)ethanamine,
N,N-dimethyl-2-(2-(diethoxyethylsilyl)ethoxy)ethanamine,
N,N-diethyl-2-(2-(trimethoxysilyl)ethoxy)ethanamine,
N,N-diethyl-2-(2-(dimethoxymethylsilyl)ethoxy)ethanamine,
N,N-diethyl-2-(2-(dimethoxyethylsilyl)ethoxy)ethanamine,
N,N-diethyl-2-(2-(triethoxysilyl)ethoxy)ethanamine,
N,N-diethyl-2-(2-(diethoxymethylsilyl)ethoxy)ethanamine,
N,N-diethyl-2-(2-(diethoxyethylsilyl)ethoxy)ethanamine,
N,N-bis(trimethylsilyl)-2-(2-(trimethoxysilyl)ethoxy)ethanamine,
N,N-bis(trimethylsilyl)-2-(2-(dimethoxymethylsilyl)ethoxy)ethanamine,
N,N-bis(trimethylsilyl)-2-(2-(dimethoxyethylsilyl)ethoxy)ethanamine,
N,N-bis(trimethylsilyl)-2-(2-(triethoxysilyl)ethoxy)ethanamine,
N,N-bis(trimethylsilyl)-2-(2-(diethoxymethylsilyl)ethoxy)ethanamine,
N,N-bis(trimethylsilyl)-2-(2-(diethoxyethylsilyl)ethoxy)ethanamine,
N,N-dimethyl-2-(3-(trimethoxysilyl)propoxy)ethanamine,
N,N-dimethyl-2-(3-(dimethoxymethylsilyl)propoxy)ethanamine,
N,N-dimethyl-2-(3-(dimethoxyethylsilyl)propoxy)ethanamine,
N,N-dimethyl-2-(3-(triethoxysilyl)propoxy)ethanamine,
N,N-dimethyl-2-(3-(diethoxymethylsilyl)propoxy)ethanamine,
N,N-dimethyl-2-(3-(diethoxyethylsilyl)propoxy)ethanamine,
N,N-diethyl-2-(3-(trimethoxysilyl)propoxy)ethanamine,
N,N-diethyl-2-(3-(dimethoxymethylsilyl)propoxy)ethanamine,
N,N-diethyl-2-(3-(dimethoxyethylsilyl)propoxy)ethanamine,
N,N-diethyl-2-(3-(triethoxysilyl)propoxy)ethanamine,
N,N-diethyl-2-(3-(diethoxymethylsilyl)propoxy)ethanamine,
N,N-diethyl-2-(3-(diethoxyethylsilyl)propoxy)ethanamine,
N,N-bis(trimethylsilyl)-2-(3-(trimethoxysilyl)propoxy)ethanamine,
N,N-bis(trimethylsilyl)-2-(3-(dimethoxymethylsilyl)propoxy)ethanamine,
N,N-bis(trimethylsilyl)-2-(3-(dimethoxyethylsilyl)propoxy)ethanamine,
N,N-bis(trimethylsilyl)-2-(3-(triethoxysilyl)propoxy)ethanamine,
N,N-bis(trimethylsilyl)-2-(3-(diethoxymethylsilyl)propoxy)ethanamine,
N,N-bis(trimethylsilyl)-2-(3-(diethoxyethylsilyl)propoxy)ethanamine,
N,N-dimethyl-3-(2-(trimethoxysilyl)ethoxy)propan-1-amine,
N,N-dimethyl-3-(2-(dimethoxymethylsilyl)ethoxy)propan-1-amine,
N,N-dimethyl-3-(2-(dimethoxyethylsilyl)ethoxy)propan-1-amine,
N,N-dimethyl-3-(2-(triethoxysilyl)ethoxy)propan-1-amine,
N,N-dimethyl-3-(2-(diethoxymethylsilyl)ethoxy)propan-1-amine,
N,N-dimethyl-3-(2-(diethoxyethylsilyl)ethoxy)propan-1-amine,
N,N-diethyl-3-(2-(trimethoxysilyl)ethoxy)propan-1-amine,
N,N-diethyl-3-(2-(dimethoxymethylsilyl)ethoxy)propan-1-amine,
N,N-diethyl-3-(2-(dimethoxyethylsilyl)ethoxy)propan-1-amine,
N,N-diethyl-3-(2-(triethoxysilyl)ethoxy)propan-1-amine,
N,N-diethyl-3-(2-(diethoxymethylsilyl)ethoxy)propan-1-amine,
N,N-diethyl-3-(2-(diethoxyethylsilyl)ethoxy)propan-1-amine,
N,N-bis(trimethylsilyl)-3-(2-(trimethoxysilyl)ethoxy)propan-1-amine,
N,N-bis(trimethylsilyl)-3-(2-(dimethoxymethylsilyl)ethoxy)propan-1-amine,
N,N-bis(trimethylsilyl)-3-(2-(dimethoxyethylsilyl)ethoxy)propan-1-amine,
N,N-bis(trimethylsilyl)-3-(2-(triethoxysilyl)ethoxy)propan-1-amine,
N,N-bis(trimethylsilyl)-3-(2-(diethoxymethylsilyl)ethoxy)propan-1-amine,
N,N-bis(trimethylsilyl)-3-(2-(diethoxyethylsilyl)ethoxy)propan-1-amine,
N,N-dimethyl-3-(3-(trimethoxysilyl)propoxy)propan-1-amine,
N,N-dimethyl-3-(3-(dimethoxymethylsilyl)propoxy)propan-1-amine,
N,N-dimethyl-3-(3-(dimethoxyethylsilyl)propoxy)propan-1-amine,
N,N-dimethyl-3-(3-(triethoxysilyl)propoxy)propan-1-amine,
N,N-dimethyl-3-(3-(diethoxymethylsilyl)propoxy)propan-1-amine,
N,N-dimethyl-3-(3-(diethoxyethylsilyl)propoxy)propan-1-amine,
N,N-diethyl-3-(3-(trimethoxysilyl)propoxy)propan-1-amine,
N,N-diethyl-3-(3-(dimethoxymethylsilyl)propoxy)propan-1-amine,
N,N-diethyl-3-(3-(dimethoxyethylsilyl)propoxy)propan-1-amine,
N,N-diethyl-3-(3-(triethoxysilyl)propoxy)propan-1-amine,
N,N-diethyl-3-(3-(diethoxymethylsilyl)propoxy)propan-1-amine,
N,N-diethyl-3-(3-(diethoxyethylsilyl)propoxy)propan-1-amine,
N,N-bis(trimethylsilyl)-3-(3-(trimethoxysilyl)propoxy)propan-1-amine,
N,N-bis(trimethylsilyl)-3-(3-(dimethoxymethylsilyl)propoxy)propan-1-amine,
N,N-bis(trimethylsilyl)-3-(3-(dimethoxyethylsilyl)propoxy)propan-1-amine,
N,N-bis(trimethylsilyl)-3-(3-(triethoxysilyl)propoxy)propan-1-amine,
N,N-bis(trimethylsilyl)-3-(3-(diethoxymethylsilyl)propoxy)propan-1-amine and
N,N-bis(trimethylsilyl)-3-(3-(diethoxyethylsilyl)propoxy)propan-1-amine.

As described above, since the end modifier of the present invention exhibits very superior compatibility with carbon black or silica used as an inorganic reinforcing agent owing to the characteristics originating from its molecular structure, a conjugated diene polymer to which the end modifier is bound has improved mechanical properties, dynamic properties, wear resistance and mixing processability because of better compatibility with the reinforcing agent such as carbon black or silica as compared to the existing diene-based polymers.

A method for preparing the end-modified conjugated diene polymer according to the present invention will be described.

In the present invention, the end-modified conjugated diene polymer is prepared by a solution polymerization method. That is to say, after adding an organolithium catalyst, a Lewis base, a hydrocarbon solvent and a compound having a functional group and activating a polymerization initiator, a conjugated diene polymer is prepared by performing living anionic polymerization. The prepared living polymer is modified with an end modifier to prepare an end-modified conjugated diene polymer.

To describe in more detail, an organolithium catalyst alone or an organolithium catalyst and a secondary amine- or imine-based compound is activated by dissolving in tetrahydrofuran or a similar polar solvent. With this as a polymerization initiator, a living polymer is obtained by polymerizing a conjugated diene-based monomer and/or an aromatic vinyl-based monomer. Subsequently, the living polymer is subjected to coupling, i.e. end modification, with the end modifier represented by Chemical Formula 1 to prepare the end-modified conjugated diene polymer according to the present invention.

The conjugated diene polymer of the present invention may be either a homopolymer of a conjugated diene-based monomer or a copolymer of a conjugated diene-based monomer and an aromatic vinyl-based monomer. As a monomer that can be used for the polymerization in the present invention, the conjugated diene-based monomer may be a $C_4$-$C_{12}$ unsaturated hydrocarbon and may contain 4-8 unsaturated bonds per molecule. Specific examples of the conjugated diene-based monomer may include butadiene, isoprene, 2,3-dimethyl-1,3-butadiene, 1,3-pentadiene, octadiene, etc. And, the vinyl aromatic monomer may be styrene, 2-methylstyrene, 3-methylstyrene, 4-methylstyrene, α-methylstyrene, 2,4-dimethylstyrene, 2,4-diisopropylstyrene, 4-tert-butylstyrene, divinylstyrene, tert-butoxystyrene, vinylbenzyldimethylamine, (4-vinylbenzyl)dimethyl aminoethyl ether, N,N-dimethylaminoethylstyrene, 2-tert-butylstyrene, 3-tert-butylstyrene, 4-tert-butylstyrene, vinylpyridine or a mixture thereof.

As the polymerization initiator used for the living polymerization, the secondary amine- or imine-based compound is used together with an organic alkali metal compound. Since the secondary amine- or imine-based compound reacts with the organic alkali metal compound, an organolithium compound such as n-butyllithium or sec-butyllithium may be used after being activated in a polar solvent such as tetrahydrofuran. For example, a secondary amine- or imine-based compound such as dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-ethylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azepine, hexamethyleneimine, heptamethyleneimine, 5-benzyloxyindone, 3-azaspiro[5,5]undecane, 3-azabicyclo[3.2.2]nonane, carbazole, etc. may be used.

The hydrocarbon solvent used for the polymerization may be n-hexane, n-heptane, isooctane, cyclohexane, methylcyclopentane, benzene, toluene, etc. may be used. In particular, n-hexane, n-heptane, cyclohexane, etc. may be used alone or in combination. The monomer may be included in the hydrocarbon solvent in an amount of 5-40 wt %, more specifically 10-25 wt %. If the content of the monomer is less than 5 wt %, it is difficult to prepare the polymer. And, if the content exceeds 40 wt %, control of solution viscosity and heat of reaction is difficult.

As the Lewis base compound used for control of the microstructure of the polymer, tetrahydrofuran, N,N,N,N-tetramethylethylenediamine, di-n-propyl ether, diisopropyl ether, di-n-butyl ether, ethyl butyl ether, triethylene glycol, 1,2-dimethoxybenzene, trimethylamine, triethylamine, ditetrahydrofurfurylpropane or ethyl tetrahydrofurfuryl ether may be used. Specifically, ditetrahydrofurfurylpropane, tetrahydrofuran, N,N,N,N-tetramethylethylenediamine or ethyl tetrahydrofurfuryl ether may be used among them.

The Lewis base may be used in a suitable amount to obtain the random structure of the monomer and the content of the vinyl structure. Polymerization temperature is typically about 10-100° C., specifically 20-90° C. and reaction pressure may be 0.5-10 kgf/cm$^2$.

The polymerization may be carried out until the monomer is completely converted into the polymer. That is to say, the polymerization may be carried out until a high conversion rate is achieved.

For the end modification of the conjugated diene polymer, coupling reaction is performed between the living polymer and the end modifier. After conversion of 90% or more of the monomer to the polymer is confirmed, 0.01-1 part by weight of an organosilane compound is added. Then, after a predetermined time, the polymerization is completed by adding a polymerization terminator.

The end-modified conjugated diene polymer polymerized by the polymerization has a Mooney viscosity (ML$_{1+4}$ @ 100° C.) of 20-200, specifically 30-160, and has a vinyl content in the conjugated diene-based compound of 10-90 wt %, specifically 30-80 wt %.

The microstructure of the end-modified conjugated diene polymer, the compositional ratio of the conjugated diene-based monomer and the aromatic vinyl-based monomer, the block percentage of the conjugated diene-based monomer and the aromatic vinyl-based monomer and the end modification may be analyzed by nuclear magnetic resonance (NMR) spectroscopy, IR spectroscopy, etc. And, coupling number (CN), compositional efficiency (CE), molecular weight (Mw) and molecular weight distribution (MWD) may be analyzed by gel permeation chromatography (GPC). The Mooney viscosity of the rubber may be analyzed using a Mooney viscometer and the rubber may be mixed using a 500-cc lab mixer.

The present invention also provides polymer composition for a tire including the end-modified conjugated diene polymer and an inorganic reinforcing agent.

Specifically, the polymer composition of the present invention may include 100 parts by weight of the end-modified conjugated diene polymer and 50-100 parts by weight of an inorganic reinforcing agent. The inorganic reinforcing agent used in the present invention may be one commonly used in the preparation of a tire and may include carbon black, silica, etc.

EXAMPLES

The present invention will be described in more detail through examples. However, the scope of this invention is not limited by the examples.

Although the silica-mixed rubber of the present invention exhibits a coupling ratio of about 30%, those of ordinary skill in the art can make various modifications within the scope of the present invention.

The following examples describe a method for preparing an SBR random copolymer according to the present invention as well as degree of coupling, Mooney viscosity and vinyl content of the polymer. The following examples are for illustrative purposes only and are not intended to limit the scope of the present invention. Unless specified otherwise, all percentages (%) are based on weight.

Preparation Examples

Preparation of End Modifiers

Preparation Example 1

Preparation of N,N-dimethyl-2-(3-(dimethoxymethylsilyl)propoxy)ethanamine

Sodium hydride (17.5 g) and dimethyl formaldehyde (400 mL) were added to a 2-L round-bottom flask. The flask was immersed in an ice bath to maintain the temperature at 0° C. and 2-dimethylaminoethanol (0.398 mol) was added. After stirring for about 30 minutes and adding allyl bromide (0.4378 mol), the temperature of the reactor was raised to room temperature and the mixture was stirred for 3 hours. Upon completion of reaction, the reaction was terminated by adding water to the flask and the product was extracted using diethyl ether. After filtration under reduced pressure, 2-(allyloxy)-N,N-dimethylethanamine was purified by fractional distillation for use in the following reaction.

After adding toluene (200 mL) to a round-bottom flask containing 2-(allyloxy)-N,N-dimethylethanamine (0.398 mol) and dissolving trimethoxysilane (0.398 mol), a commercially available platinum(0)-1,3-divinyl-1,1,3,3-tetramethyldisiloxane solution was added and the mixture was stirred for 24 hours. Upon completion of reaction, after removing the solvent through distillation under reduced pressure, 0.319 mol (yield: 80%) of the target compound was obtained by extracting with water and diethyl ether. $^1$H and $^{13}$C NMR spectroscopic data of the purified N,N-dimethyl-2-(3-(dimethoxymethylsilyl)propoxy)ethanamine are as follows.

$^1$H NMR (400 MHz, CDCl$_3$) δ 3.50 (8H, m), 3.39 (2H, t, J=6.4 Hz), 2.47 (2H, t, J=6.4 Hz), 2.24 (6H, s), 1.65 (2H, m), 0.60 (2H, t, J=8 Hz), 0.09 (3H, s); $^{13}$C NMR (100 MHz, CDCl$_3$) δ 73.6, 68.8, 58.9, 50.2, 45.9, 22.8, 9.1, −5.9.

Preparation Example 2

Preparation of N,N-bis(trimethylsilyl)-2-(3-(trimethoxysilyl)propoxy)ethanamine

After adding toluene (200 mL) to a round-bottom flask containing 2-(allyloxy)ethanamine (0.398 mol) and dissolving trimethoxysilane (0.398 mol), a commercially available platinum(0)-1,3-divinyl-1,1,3,3-tetramethyldisiloxane solution was added and the mixture was stirred for 24 hours. Upon completion of reaction, after removing the solvent through distillation under reduced pressure and extracting with water and diethyl ether, the product was dissolved in dichloromethane (200 mL). After adding triethylamine (1.0 mol) and trimethylchlorosilane (0.8 mol), the mixture was stirred for a day at room temperature. Upon completion of reaction, after removing the solvent through distillation under reduced pressure, 0.342 mol (yield: 86%) of the target compound was obtained by extracting with water and diethyl ether. $^1$H and $^{13}$C NMR spectroscopic data of the purified N,N-bis(trimethylsilyl)-2-(3-(trimethoxysilyl)propoxy)ethanamine are as follows.

$^1$H NMR (400 MHz, CDCl$_3$) δ 3.52 (9H, s), 3.49 (2H, t, J=6.4 Hz), 3.38 (2H, t, J=6.4 Hz), 2.47 (2H, t, J=6.4 Hz), 1.67 (2H, m), 0.64 (2H, t, J=8 Hz), 0.05 (27H, s); $^{13}$C NMR (100 MHz, CDCl$_3$) δ 73.4, 68.5, 59.0, 45.9, 22.8, 5.4, −4.8

Preparation Example 3

Preparation of N,N-dimethyl-2-(3-(trimethoxysilyl)propoxy)ethanamine

Sodium hydride (17.5 g) and dimethyl formaldehyde (400 mL) were added to a 2-L round-bottom flask. The flask was immersed in an ice bath to maintain the temperature at 0° C. and 2-dimethylaminoethanol (0.398 mol) was added. After stirring for about 30 minutes and adding allyl bromide (0.4378 mol), the temperature of the reactor was raised to room temperature and the mixture was stirred for 3 hours. Upon completion of reaction, the reaction was terminated by adding water to the flask and the product was extracted using diethyl ether. After filtration under reduced pressure, 2-(allyloxy)-N,N-dimethylethanamine was purified by fractional distillation for use in the following reaction.

After adding toluene (200 mL) to a round-bottom flask containing 2-(allyloxy)-N,N-dimethylethanamine (0.398 mol) and dissolving trimethoxysilane (0.398 mol), a commercially available platinum(0)-1,3-divinyl-1,1,3,3-tetramethyldisiloxane solution was added and the mixture was stirred for 24 hours. Upon completion of reaction, after removing the solvent through distillation under reduced pressure, 0.342 mol (yield: 86%) of the target compound was obtained by extracting with water and diethyl ether. $^1$H and $^{13}$C NMR spectroscopic data of the purified N,N-dimethyl-2-(3-(trimethoxysilyl)propoxy)ethanamine are as follows.

$^1$H NMR (400 MHz, CDCl$_3$) δ 3.52 (9H, s), 3.49 (2H, t, J=6.4 Hz), 3.38 (2H, J=6.4 Hz), 2.47 (2H, t, J=6.4 Hz), 2.24 (6H, s), 1.67 (2H, m), 0.64 (2H, t, J=8 Hz); $^{13}$C NMR (100 MHz, CDCl$_3$) δ 73.3, 68.8, 58.9, 50.5, 45.9, 22.7, 5.3.

Preparation Example 4

Preparation of N,N-dimethyl-3-(3-(triethoxysilyl)propoxy)propan-1-amine

Sodium hydride (17.5 g) and dimethyl formaldehyde (400 mL) were added to a 2-L round-bottom flask. The flask was immersed in an ice bath to maintain the temperature at 0° C. and 3-dimethylamino-1-propanol (0.398 mol) was added. After stirring for about 30 minutes and adding allyl bromide (0.4378 mol), the temperature of the reactor was raised to room temperature and the mixture was stirred for 3 hours. Upon completion of reaction, the reaction was terminated by adding water to the flask and the product was extracted using diethyl ether. After filtration under reduced pressure, 3-(allyloxy)-N,N-dimethylpropan-1-amine was purified by fractional distillation for use in the following reaction.

After adding toluene (200 mL) to a round-bottom flask containing 3-(allyloxy)-N,N-dimethylpropan-1-amine (0.398 mol) and dissolving trimethoxysilane (0.398 mol), a commercially available platinum(0)-1,3-divinyl-1,1,3,3-tetramethyldisiloxane solution was added and the mixture was stirred for 24 hours. Upon completion of reaction, after removing the solvent through distillation under reduced pressure, 0.340 mol (yield: 85%) of the target compound was obtained by extracting with water and diethyl ether. $^1$H and $^{13}$C NMR spectroscopic data of the purified N,N-dimethyl-2-(3-(triethoxysilyl)propoxy)propan-1-amine are as follows.

$^1$H NMR (400 MHz, CDCl$_3$) δ 3.79 (6H, q, J=6.4 Hz), 3.36 (2H, t, J=6.4 Hz), 3.26 (2H, J=6.4 Hz), 2.31 (2H, t, J=6.4 Hz), 2.19 (6H, s), 1.72 (2H, m), 1.67 (2H, m), 1.21 (9H, t, J=6.4 Hz), 0.64 (2H, t, J=8.0 Hz); $^{13}$C NMR (100 MHz, CDCl$_3$) δ 73.0, 69.0, 56.8, 50.5, 45.5, 28.0, 22.8, 18.4, 5.3.

EXAMPLES

Example 1

Preparation of End-Modified Styrene-Butadiene Copolymer

Styrene (88 g), 1,3-butadiene (307 g) and cyclohexane (2,200 g) were supplied to a 5-L glass reactor and tetrahydrofuran (4 mL) was added to the reactor. Then, the temperature inside the reactor was adjusted to 30° C. while operating a stirrer. When the reactor temperature reached 30° C., n-butyllithium (2.4 mmol) was added to the reactor as a polymerization initiator and an adiabatic heating reaction was carried out. The degree of polymerization was determined by monitoring the change of reaction temperature. During the reaction, the monomer ratio and the conversion rate were analyzed by taking a small amount of the product constantly.

When the reaction temperature reached 80° C., 1,3-butadiene (5 g) was further added to substitute the terminal group with butadiene. After the addition of 1,3-butadiene was completed, N,N-dimethyl-2-(3-(dimethoxymethylsilyl)propoxy)ethanamine (2.7 mmol) was added to the reactor as an end modifier. Upon completion of end modification, butylated hydroxytoluene (20 g) was added to the reactor as an antioxidant to terminate the reaction. The resulting polymer was stirred in warm water heated with steam to remove the solvent. Subsequently, the remaining solvent and water were removed by roll drying.

$^1$H NMR spectrum of the prepared end-modified styrene-butadiene copolymer is shown in FIG. 1.

Referring to FIG. 1, a chemical shift (δ) of proton of the styrene block is observed at 6.8-7.5 ppm and a chemical shift (δ) of olefin such as a vinyl group is observed at 4.5-6.0 ppm. A chemical shift (δ) of two methyl groups bound to the amine group of the end modifier is observed at 2.7 ppm and a chemical shift (δ) of a methyl group bound to the silicon (Si) of the end modifier is observed at 0.0 ppm. This spectrum reveals that an organic siloxyamine group is bound to the end of the styrene-butadiene copolymer.

Example 2

Preparation of End-Modified Styrene-Butadiene Copolymer

An end-modified styrene-butadiene copolymer was prepared in the same manner as in Example 1 except for using N,N-bis(trimethylsilyl)-2-(3-(trimethoxysilyl)propoxy)ethanamine (2.7 mmol) as an end modifier.

Figure 2:
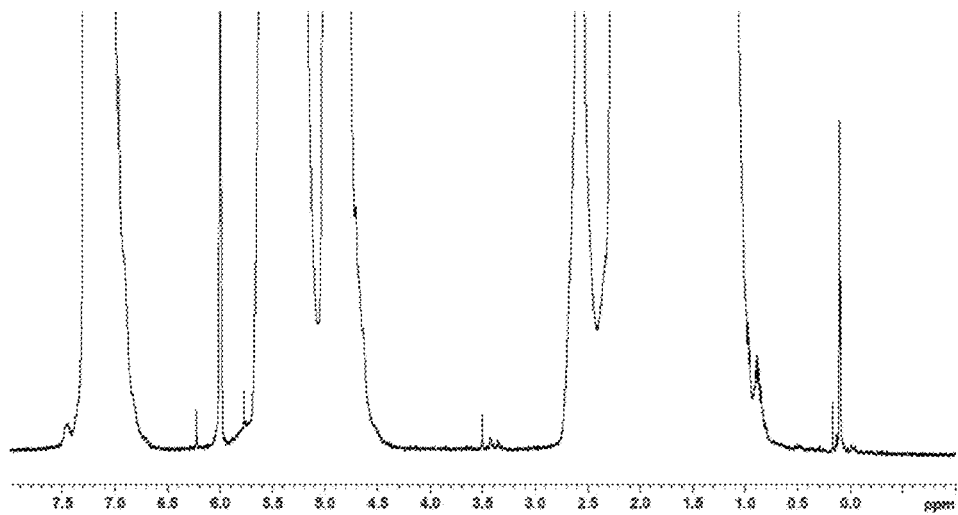
FIG. 2 is a $^1$H NMR spectrum of a styrene-butadiene copolymer end-modified with N,N-bis(trimethylsilyl)-2-(3-(trimethoxysilyl)propoxy)ethanamine.

$^1$H NMR spectrum of the prepared end-modified styrene-butadiene copolymer is shown in FIG. 2.

Referring to FIG. 2, the chemical shifts (δ) of proton and olefin of the styrene block coincide with those of the polymer of Example 1. A chemical shift (δ) of a trimethylsilyl group bound to the amine is observed at 0.0 ppm. This spectrum reveals that an organic siloxyamine group is bound to the end of the styrene-butadiene copolymer.

Example 3

Preparation of End-Modified Styrene-Butadiene Copolymer

An end-modified styrene-butadiene copolymer was prepared in the same manner as in Example 1 except for using N,N-dimethyl-2-(3-(trimethoxysilyl)propoxy)ethanamine (2.7 mmol) as an end modifier.

Figure 3:
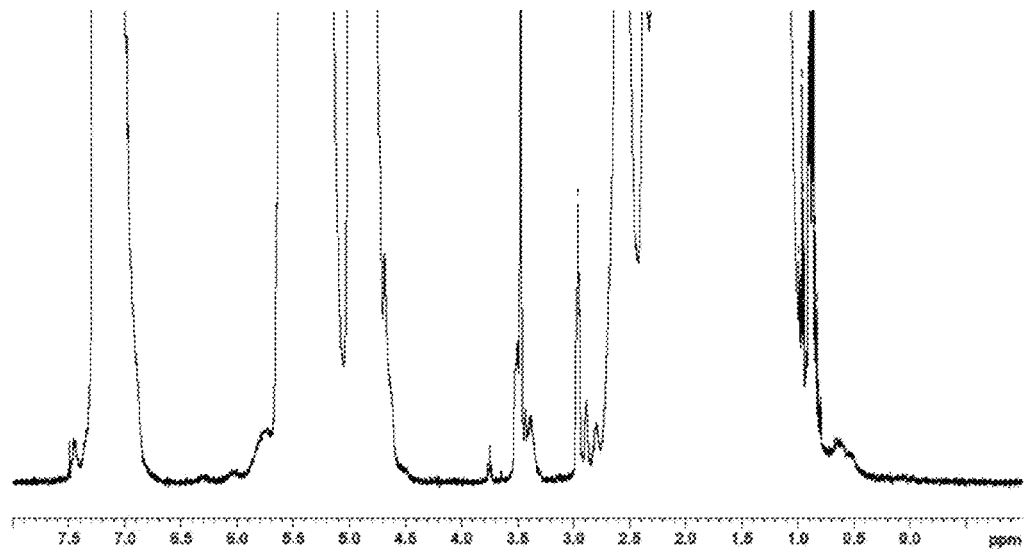
FIG. 3 is a $^1$H NMR spectrum of a styrene-butadiene copolymer end-modified with N,N-dimethyl-2-(3-(trimethoxysilyl)propoxy)ethanamine.

$^1$H NMR spectrum of the prepared end-modified styrene-butadiene copolymer is shown in FIG. 3.

Referring to FIG. 3, the chemical shifts (δ) of proton and olefin of the styrene block coincide with those of the polymer of Example 1. A chemical shift (δ) of two methyl groups bound to the amine is observed at 2.7 ppm and a chemical shift (δ) of a trimethoxy group bound to the silicon (Si) of the end modifier is observed at 3.5 ppm. This spectrum reveals that an organic siloxyamine group is bound to the end of the styrene-butadiene copolymer.

Example 4

Preparation of End-Modified Styrene-Butadiene Copolymer

An end-modified styrene-butadiene copolymer was prepared in the same manner as in Example 1 except for using N,N-dimethyl-3-(3-(triethoxysilyl)propoxy)propan-1-amine (2.7 mmol) as an end modifier.

Figure 4:
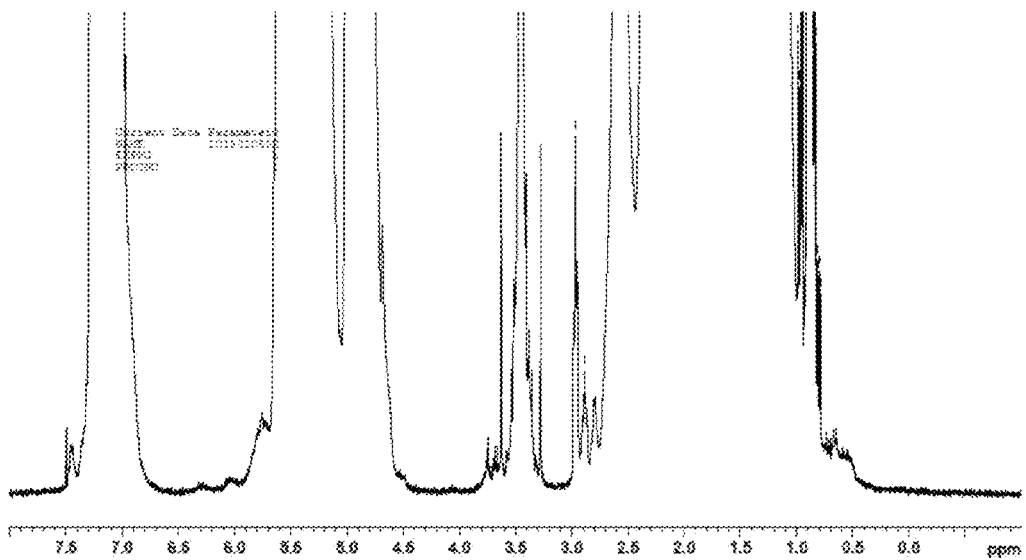
FIG. 4 is a $^1$H NMR spectrum of a styrene-butadiene copolymer end-modified with N,N-dimethyl-3-(3-(triethoxysilyl)propoxy)propan-1-amine.

$^1$H NMR spectrum of the prepared end-modified styrene-butadiene copolymer is shown in FIG. 4.

Referring to FIG. 4, the chemical shifts (δ) of proton and olefin of the styrene block coincide with those of the polymer of Example 1. A chemical shift (δ) of two methyl groups bound to the amine is observed at 2.7 ppm and a chemical shift (δ) of a trimethoxy group bound to the silicon (Si) of the end modifier is observed at 3.5 ppm. This spectrum reveals that an organic siloxyamine group is bound to the end of the styrene-butadiene copolymer.

Comparative Example 1

Preparation of Styrene-Butadiene Copolymer

A styrene-butadiene copolymer was prepared in the same manner as in Example 1 except for not using an end modifier.

Comparative Example 2

Preparation of End-Modified Styrene-Butadiene Copolymer

An end-modified styrene-butadiene copolymer was prepared in the same manner as in Example 1 except for using N,N-dimethylaminopropyltrimethoxysilane (2.7 mmol) as an end modifier.

The characteristics of the copolymers prepared in Examples 1-4 and Comparative Examples 1-2 are summarized in Table 1. In Table 1, end modification ratio, styrene content and vinyl content were calculated from the NMR data and are given in mol % units.

TABLE 1

| | End modification ratio (mol %) | Styrene content (mol %) | Vinyl content in BD unit (mol %) | Weight-average molecular weight ($M_w$) | Mooney viscosity ($ML_{1+4}$, 100° C.) |
|---|---|---|---|---|---|
| Example 1 | 41 | 23.2 | 55.3 | 150,000 | 75 |
| Example 2 | 40 | 24.1 | 55.1 | 154,000 | 74 |
| Example 3 | 39 | 23.6 | 55.7 | 153,000 | 73 |
| Example 4 | 40 | 23.5 | 55.5 | 155,000 | 74 |
| Comparative Example 1 | 0 | 24.0 | 55.3 | 162,000 | 60 |
| Comparative Example 2 | 31 | 23.9 | 55.1 | 159,000 | 65 |

Test Examples

Test Example 1

Measurement of Physical and Dynamic Properties of Polymers

Each of the copolymers of Examples 1-4 and Comparative Examples 1-2 was mixed with silica under the condition described in Table 2.

TABLE 2

| Mixing composition | Contents (parts by weight) |
|---|---|
| Solution SBR | 80 |
| High-cis BR | 20 |
| Stearic acid | 2 |
| Zinc oxide | 3 |
| Silica | 80 |
| Aromatic oil | 10 |
| Si-69 | 6.4 |
| CZ | 1 |
| DPG | 1.5 |
| Sulfur | 1.5 |

Solution SBR: copolymers prepared in Examples 1-4 and Comparative Examples 1-2
High-cis BR: KBR01 (Kumho Petrochemical)
Si-69: bis(triethoxysilylpropyl)tetrasulfide
CZ: N-cyclohexylbenzothiazylsulfenamide
DPG: 1,3-diphenylguanidine Mixing processability and physical and dynamic properties after the mixing were measured and are compared in Table 3. The dynamic properties were analyzed by dynamic mechanical thermal analysis (DMTA).

Measurement of Physical Properties (1) Hardness: Measured using a Shore-A hardness tester.

(2) Tensile strength, 300% modulus and elongation of mixed rubber: Measured using a universal testing machine (UTM) according to ASTM 3189, Method B.

(3) Dynamic property of vulcanized rubber (tan δ): Analyzed using DTMA 5 (Rheometic) under the condition of 10 Hz frequency and 0.2% deformation.

TABLE 3

| | Examples | | | | Comparative Examples | |
|---|---|---|---|---|---|---|
| | 1 | 2 | 3 | 4 | 1 | 2 |
| Compound Mooney viscosity | 102 | 103 | 100 | 103 | 41 | 121 |
| Hardness | 72 | 73 | 73 | 73 | 61 | 74 |
| Tensile strength | 195 | 194 | 193 | 194 | 121 | 173 |
| 300% modulus | 175 | 172 | 173 | 176 | — | 138 |
| Elongation (%) | 316 | 315 | 316 | 317 | 260 | 302 |
| Compound $T_g$ (° C.) | −23.4 | −23.1 | −23.1 | −23.3 | −21.6 | −22.0 |
| Tan δ (0° C.) | 0.3971 | 0.4013 | 0.3982 | 0.3991 | 0.2011 | 0.2940 |
| Tan δ (60° C.) | 0.0772 | 0.0761 | 0.0750 | 0.0761 | 0.1059 | 0.0879 |
| Bound rubber con. (wt %) | 83 | 81 | 83 | 84 | 17 | 75 |
| Cold flow (mg/min) | 0.81 | 0.83 | 0.82 | 0.80 | 1.9 | 1.1 |

As seen from Table 3, the compositions including the end-modified polymers according to the present invention (Examples 1-4) exhibited better processability than the composition including the polymer modified with the existing end modifier (Comparative Example 2) because of low compound Mooney viscosity. Further, the polymer compositions of Examples 1-4 showed remarkably improved wet traction (tan δ at 0° C.) and rolling resistance (tan δ at 60° C.), which are important for an environment-friendly tire, as compared to the polymer compositions of Comparative Examples 1-2. In addition, the polymer compositions of Examples 1-4 showed improved bound rubber concentration and cold flow as compared to the polymer compositions of Comparative Examples 1-2.

Accordingly, a composition including the end-modified conjugated diene polymer of the present invention is useful as a tire material.

The end-modified conjugated diene polymer according to the present invention, which is end-modified with an alkoxysilane-based derivative, can solve the long-term storage problem owing to easy control of coupling efficiency and cold flow.

In addition, the end-modified conjugated diene-based copolymer according to the present invention is more closely accessible to an organic or inorganic material through hydrogen bonding or van der Waals interaction due to the alkoxysilane-based derivative substituted with an alkyl group having a tertiary amine group and an ether group. Consequently, the end-modified conjugated diene-based copolymer of the present invention has improved compatibility with an inorganic reinforcing agent as well as enhanced mechanical strength and processability due to increased dispersibility. In addition, it is useful as a material for an environment-friendly tire since improvement of not only dynamic properties such as wet traction and rolling resistance but also wear resistance can be expected.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. An end-modified conjugated diene polymer, wherein the end-modified conjugated diene polymer is obtained by a reaction of an alkoxysilane-based end modifier an end of a conjugated diene polymer, where the alkoxysilane-based end modifier is represented by Chemical Formula 1:

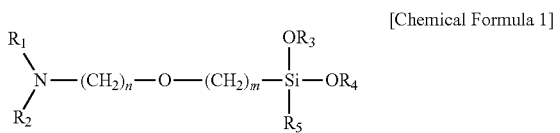

[Chemical Formula 1]

wherein $R_1$ and $R_2$, which are identical or different, represent $C_1$-$C_{10}$ alkyl, or tri($C_1$-$C_{10}$ alkyl)silyl; $R_3$ and $R_4$, which are identical or different, represent $C_1$-$C_{10}$ alkyl; $R_5$ represents $C_1$-$C_{10}$ alkyl or $C_1$-$C_{10}$ alkoxy; and n and m respectively represent an integer from 0 to 5.

2. The end-modified conjugated diene polymer according to claim 1, wherein the conjugated diene polymer is a homopolymer of a conjugated diene-based monomer or a copolymer of a conjugated diene-based monomer and an aromatic vinyl-based monomer.

3. The end-modified conjugated diene polymer according to claim 1, wherein the end modifier represented by Chemical Formula 1 is selected from the group consisting of:

N,N-dimethyl-1-(2-(trimethoxysilyl)ethoxy)methanamine,
N,N-dimethyl-1-(2-(dimethoxymethylsilyl)ethoxy)methanamine,
N,N-dimethyl-1-(2-(dimethoxyethylsilyl)ethoxy)methanamine,
N,N-dimethyl-1-(2-(triethoxysilyl)ethoxy)methanamine,
N,N-dimethyl-1-(2-(diethoxymethylsilyl)ethoxy)methanamine,
N,N-dimethyl-1-(2-(diethoxyethylsilyl)ethoxy)methanamine,
N,N-diethyl-1-(2-(trimethoxysilyl)ethoxy)methanamine,
N,N-diethyl-1-(2-(dimethoxymethylsilyl)ethoxy)methanamine,
N,N-diethyl-1-(2-(dimethoxyethylsilyl)ethoxy)methanamine,
N,N-diethyl-1-(2-(triethoxysilyl)ethoxy)methanamine,
N,N-diethyl-1-(2-(diethoxymethylsilyl)ethoxy)methanamine,
N,N-diethyl-1-(2-(diethoxyethylsilyl)ethoxy)methanamine,
N,N-bis(trimethylsilyl)-1-(2-(trimethoxysilyl)ethoxy)methanamine,
N,N-bis(trimethylsilyl)-1-(2-(dimethoxymethylsilyl)ethoxy)methanamine,
N,N-bis(trimethylsilyl)-1-(2-(dimethoxyethylsilyl)ethoxy)methanamine,
N,N-bis(trimethylsilyl)-1-(2-(triethoxysilyl)ethoxy)methanamine,
N,N-bis(trimethylsilyl)-1-(2-(diethoxymethylsilyl)ethoxy)methanamine,
N,N-bis(trimethylsilyl)-1-(2-(diethoxyethylsilyl)ethoxy)methanamine,
N,N-dimethyl-1-(3-(trimethoxysilyl)propoxy)methanamine,
N,N-dimethyl-1-(3-(dimethoxymethylsilyl)propoxy)methanamine,
N,N-dimethyl-1-(3-(dimethoxyethylsilyl)propoxy)methanamine,
N,N-dimethyl-1-(3-(triethoxysilyl)propoxy)methanamine,
N,N-dimethyl-1-(3-(diethoxymethylsilyl)propoxy)methanamine,
N,N-dimethyl-1-(3-(diethoxyethylsilyl)propoxy)methanamine,
N,N-diethyl-1-(3-(trimethoxysilyl)propoxy)methanamine,
N,N-diethyl-1-(3-(dimethoxymethylsilyl)propoxy)methanamine,
N,N-diethyl-1-(3-(dimethoxyethylsilyl)propoxy)methanamine,
N,N-diethyl-1-(3-(triethoxysilyl)propoxy)methanamine,
N,N-diethyl-1-(3-(diethoxymethylsilyl)propoxy)methanamine,
N,N-diethyl-1-(3-(diethoxyethylsilyl)propoxy)methanamine,
N,N-bis(trimethylsilyl)-1-(3-(trimethoxysilyl)propoxy)methanamine,
N,N-bis(trimethylsilyl)-1-(3-(dimethoxymethylsilyl)propoxy)methanamine,
N,N-bis(trimethylsilyl)-1-(3-(dimethoxyethylsilyl)propoxy)methanamine,
N,N-bis(trimethylsilyl)-1-(3-(triethoxysilyl)propoxy)methanamine,
N,N-bis(trimethylsilyl)-1-(3-(diethoxymethylsilyl)propoxy)methanamine,
N,N-bis(trimethylsilyl)-1-(3-(diethoxyethylsilyl)propoxy)methanamine,
N,N-dimethyl-2-(2-(trimethoxysilyl)ethoxy)ethanamine,
N,N-dimethyl-2-(2-(dimethoxymethylsilyl)ethoxy)ethanamine,
N,N-dimethyl-2-(2-(dimethoxyethylsilyl)ethoxy)ethanamine,
N,N-dimethyl-2-(2-(triethoxysilyl)ethoxy)ethanamine,
N,N-dimethyl-2-(2-(diethoxymethylsilyl)ethoxy)ethanamine,
N,N-dimethyl-2-(2-(diethoxyethylsilyl)ethoxy)ethanamine,
N,N-diethyl-2-(2-(trimethoxysilyl)ethoxy)ethanamine,
N,N-diethyl-2-(2-(dimethoxymethylsilyl)ethoxy)ethanamine,
N,N-diethyl-2-(2-(dimethoxyethylsilyl)ethoxy)ethanamine,
N,N-diethyl-2-(2-(triethoxysilyl)ethoxy)ethanamine,
N,N-diethyl-2-(2-(diethoxymethylsilyl)ethoxy)ethanamine
N,N-diethyl-2-(2-(diethoxyethylsilyl)ethoxy)ethanamine,
N,N-bis(trimethylsilyl)-2-(2-(trimethoxysilyl)ethoxy)ethanamine, N,N-bis(trimethylsilyl)-2-(2-(dimethoxymethylsilyl)ethoxy)ethanamine,
N,N-bis(trimethylsilyl)-2-(2-(dimethoxyethylsilyl)ethoxy)ethanamine,
N,N-bis(trimethylsilyl)-2-(2-(triethoxysilyl)ethoxy)ethanamine,
N,N-bis(trimethylsilyl)-2-(2-(diethoxymethylsilyl)ethoxy)ethanamine,
N,N-bis(trimethylsilyl)-2-(2-(diethoxyethylsilyl)ethoxy)ethanamine,
N,N-dimethyl-2-(3-(trimethoxysilyl)propoxy)ethanamine,
N,N-dimethyl-2-(3-(dimethoxymethylsilyl)propoxy)ethanamine,
N,N-dimethyl-2-(3-(dimethoxyethylsilyl)propoxy)ethanamine,
N,N-dimethyl-2-(3-(triethoxysilyl)propoxy)ethanamine,
N,N-dimethyl-2-(3-(diethoxymethylsilyl)propoxy)ethanamine,
N,N-dimethyl-2-(3-(diethoxyethylsilyl)propoxy)ethanamine,
N,N-diethyl-2-(3-(trimethoxysilyl)propoxy)ethanamine,
N,N-diethyl-2-(3-(dimethoxymethylsilyl)propoxy)ethanamine,
N,N-diethyl-2-(3-(dimethoxyethylsilyl)propoxy)ethanamine,
N,N-diethyl-2-(3-(triethoxysilyl)propoxy)ethanamine,
N,N-diethyl-2-(3-(diethoxymethylsilyl)propoxy)ethanamine,
N,N-diethyl-2-(3-(diethoxyethylsilyl)propoxy)ethanamine,
N,N-bis(trimethylsilyl)-2-(3-(trimethoxysilyl)propoxy)ethanamine,
N,N-bis(trimethylsilyl)-2-(3-(dimethoxymethylsilyl)propoxy)ethanamine,
N,N-bis(trimethylsilyl)-2-(3-(dimethoxyethylsilyl)propoxy)ethanamine,
N,N-bis(trimethylsilyl)-2-(3-(triethoxysilyl)propoxy)ethanamine,
N,N-bis(trimethylsilyl)-2-(3-(diethoxymethylsilyl)propoxy)ethanamine,
N,N-bis(trimethylsilyl)-2-(3-(diethoxyethylsilyl)propoxy)ethanamine,
N,N-dimethyl-3-(2-(trimethoxysilyl)ethoxy)propan-1-amine,
N,N-dimethyl-3-(2-(dimethoxymethylsilyl)ethoxy)propan-1-amine,
N,N-dimethyl-3-(2-(dimethoxyethylsilyl)ethoxy)propan-1-amine,
N,N-dimethyl-3-(2-(triethoxysilyl)ethoxy)propan-1-amine,
N,N-dimethyl-3-(2-(diethoxymethylsilyl)ethoxy)propan-1-amine,
N,N-dimethyl-3-(2-(diethoxyethylsilyl)ethoxy)propan-1-amine,
N,N-diethyl-3-(2-(trimethoxysilyl)ethoxy)propan-1-amine,
N,N-diethyl-3-(2-(dimethoxymethylsilyl)ethoxy)propan-1-amine,
N,N-diethyl-3-(2-(dimethoxyethylsilyl)ethoxy)propan-1-amine,
N,N-diethyl-3-(2-(triethoxysilyl)ethoxy)propan-1-amine,
N,N-diethyl-3-(2-(diethoxymethylsilyl)ethoxy)propan-1-amine,
N,N-diethyl-3-(2-(diethoxyethylsilyl)ethoxy)propan-1-amine,
N,N-bis(trimethylsilyl)-3-(2-(trimethoxysilyl)ethoxy)propan-1-amine,
N,N-bis(trimethylsilyl)-3-(2-(dimethoxymethylsilyl)ethoxy)propan-1-amine,
N,N-bis(trimethylsilyl)-3-(2-(dimethoxyethylsilyl)ethoxy)propan-1-amine,
N,N-bis(trimethylsilyl)-3-(2-(triethoxysilyl)ethoxy)propan-1-amine,
N,N-bis(trimethylsilyl)-3-(2-(diethoxymethylsilyl)ethoxy)propan-1-amine,
N,N-bis(trimethylsilyl)-3-(2-(diethoxyethylsilyl)ethoxy)propan-1-amine,
N,N-dimethyl-3-(3-(trimethoxysilyl)propoxy)propan-1-amine,
N,N-dimethyl-3-(3-(dimethoxymethylsilyl)propoxy)propan-1-amine,
N,N-dimethyl-3-(3-(dimethoxyethylsilyl)propoxy)propan-1-amine,
N,N-dimethyl-3-(3-(triethoxysilyl)propoxy)propan-1-amine,
N,N-dimethyl-3-(3-(diethoxymethylsilyl)propoxy)propan-1-amine,
N,N-dimethyl-3-(3-(diethoxyethylsilyl)propoxy)propan-1-amine,
N,N-diethyl-3-(3-(trimethoxysilyl)propoxy)propan-1-amine,
N,N-diethyl-3-(3-(dimethoxymethylsilyl)propoxy)propan-1-amine,
N,N-diethyl-3-(3-(dimethoxyethylsilyl)propoxy)propan-1-amine,
N,N-diethyl-3-(3-(triethoxysilyl)propoxy)propan-1-amine,
N,N-diethyl-3-(3-(diethoxymethylsilyl)propoxy)propan-1-amine,
N,N-diethyl-3-(3-(diethoxyethylsilyl)propoxy)propan-1-amine,
N,N-bis(trimethylsilyl)-3-(3-(trimethoxysilyl)propoxy)propan-1-amine,
N,N-bis(trimethylsilyl)-3-(3-(dimethoxymethylsilyl)propoxy)propan-1-amine,
N,N-bis(trimethylsilyl)-3-(3-(dimethoxyethylsilyl)propoxy)propan-1-amine,
N,N-bis(trimethylsilyl)-3-(3-(triethoxysilyl)propoxy)propan-1-amine,
N,N-bis(trimethylsilyl)-3-(3-(diethoxymethylsilyl)propoxy)propan-1-amine and
N,N-bis(trimethylsilyl)-3-(3-(diethoxyethylsilyl)propoxy)propan-1-amine.

4. A polymer composition comprising:
the end-modified conjugated diene polymer according to claim 1; and
an inorganic reinforcing agent.

5. The polymer composition according to claim 4, wherein the inorganic reinforcing agent is selected from a group consisting of carbon black and silica.

6. A tire prepared from the polymer composition according to claim 4.

7. The polymer composition according to claim 4, wherein the inorganic reinforcing agent is included in an amount of 20-100 parts by weight based on 100 parts by weight of the end-modified conjugated diene polymer.

* * * * *